United States Patent [19]

Aoki et al.

[11] Patent Number: 4,800,560

[45] Date of Patent: Jan. 24, 1989

[54] SYNCHRONIZATION CONTROL CAPABLE OF ESTABLISHING SYNCHRONIZATION WITHOUT TRANSMISSION OF DISTANCE INFORMATION BETWEEN CONTROL AND LOCAL EARTH STATIONS

[75] Inventors: Takahiro Aoki; Shunichiro Tejima, both of Tokyo, Japan

[73] Assignee: NEC Corporation, Japan

[21] Appl. No.: 25,342

[22] Filed: Mar. 13, 1987

[30] Foreign Application Priority Data

Mar. 15, 1986 [JP] Japan ................... 61-56086

[51] Int. Cl.$^4$ ............................................. H04J 3/06
[52] U.S. Cl. .................................... 370/104; 370/108
[58] Field of Search ................ 370/104, 95, 108, 100; 455/12

[56] References Cited

U.S. PATENT DOCUMENTS 3,320,611  5/1967  Sekimoto et al. ..................... 455/12
3,566,267  2/1971  Golding ............................... 370/104
4,689,787  8/1987  Hotta .................................. 370/104

OTHER PUBLICATIONS

Samejima et al., Burst Synchronization for Domestic TDMA System, Review of the Electrical Comm. Lab., vol. 26, 1978.

Primary Examiner—Douglas W. Olms
Assistant Examiner—Min Jung
Attorney, Agent, or Firm—Laff, Whitesel, Conte & Saret

[57] ABSTRACT

In a TDMA satellite communication network comprising control and local earth stations communicable with one another through a satellite, a time difference between transmission and reception of a reference burst is measured at the control earth station to detect a time deviation (Tb) from a standard offset time (SO) predetermined for the control earth station. In the control earth station, the time deviation is doubled and added to the standard offset time to provide a reception time instant ($t_4$) for the local earth station. Thus, the reception time instant is varied and predicted in the control earth station with reference to the time deviation detected in the control earth station. The local earth station determines a transmission time instant ($t_2$ or $t_2'$) by delaying a reception timing signal by a predetermined time interval (Ta).

6 Claims, 5 Drawing Sheets

SYNCHRONIZATION CONTROL CAPABLE OF ESTABLISHING SYNCHRONIZATION WITHOUT TRANSMISSION OF DISTANCE INFORMATION BETWEEN CONTROL AND LOCAL EARTH STATIONS

BACKGROUND OF THE INVENTION

This invention relates to an earth station for use in a time division multiple access (often abbreviated to TDMA) satellite communication network.

A TDMA satellite communication network comprises a plurality of earth stations communicable with one another through a geostationary satellite (hereafter referred to simply as a satellite) in a time division fashion. Such communication is carried out in each earth station by sending an up-link signal to the satellite and by receiving a down-link signal from the satellite. Each of the up-link and the down-link signals is divisible into a succession of frames. Each frame includes a plurality of time slots to which bursts are assigned by the respective earth stations.

In such a communication network, accurate synchronization must be established in relation to the frames and the bursts of each of the up-link and the down-link signals. Otherwise, overlap takes place between two adjacent ones of the bursts.

One of the earth stations is selected as a control or reference earth station for producing a succession of reference bursts which define the frames in the up-link signal sent from the control earth station and which may collectively be called a transmission reference timing signal. The reference bursts appear through the satellite in the down-link signal and are delivered to each earth station as a reception timing signal. The earth stations establish frame synchronization with reference to the reception timing signal and thereafter carry out reception and transmission. In addition, transmission timing is also determined in each earth station in relation to the reception timing signal.

On receiving a burst from the down-link signal within an assigned one of the down-link signal after establishment of the frame synchronization, each earth station detects a fixed pattern by monitoring autocorrelation between the fixed pattern and a received pattern included in a received one of the bursts. However, false or wrong detection of the fixed pattern often takes place due to thermal noise and the like.

In order to avoid such false detection, each earth station is controlled so as to intermittently open a window at a predicted time location at which a burst might be received. In this event, detection of the fixed pattern is valid only when the window is opened. As a result, superfluous or false detection of the fixed pattern becomes invalid in each earth station.

In the meantime, a distance is variable between the satellite and each earth station in the TDMA satellite communication because the satellite fluctuates from a standard position to a deviated position with time with a spatial deviation left between the standard and the deviated positions. It is therefore necessary to control or adjust synchronization of each earth station in consideration of a variation or deviation of the distance between the satellite and the earth station under consideration.

In a conventional TDMA satellite communication network, synchronization of each earth station is carried out so that the reception timing signal is received within the window by controlling the transmission timing.

More particularly, each earth station determines its own reception time slots with reference to the reference bursts to open the windows at the reception time locations. Under the circumstances, the transmission timing of each earth station is controlled so as to carry out reception within the windows. For example, it is assumed that a certain earth station can transmit its own burst to the satellite and receive the own burst in question as a reception burst. In this event, a time relationship between the reference burst and the own burst is monitored to control the transmission timing which might vary due to fluctuation of the satellite. On the other hand, when an earth station can not receive the own burst, the transmission timing is adjusted in the earth station in response to an information signal which is indicative of fluctuation of the satellite and which is given from any other earth station. Such an information signal may be either a position error signal representative of a difference between the standard position and the deviated one or a distance signal representative of a distance between the deviated position of the satellite and each earth station.

As mentioned before, each earth station must carry out operation so as to adjust synchronization and to correct fluctuation or variation of the satellite when the transmission timing is controlled in each earth station. Moreover, either the position error signal or the distance signal should be sent from any other station to the earth station when the earth station in question can not receive its own transmission burst. Thus, a superfluous information signal must be transmitted between the earth stations. Transmission of a superfluous information signal gives rise to a reduction of throughput in the satellite communication network.

Moreover, communication control is widely distributed to the local earth stations in addition to the control earth station. This makes concentration of communication control difficult.

At any rate, an expensive and complicated transmission timing control device must be included in each local earth station to control the transmission timing and results in an increase of costs of the local earth station and in an increase of a load in the local earth station.

SUMMARY OF THE INVENTION

It is an object of this invention to provide a time division multiple access (TDMA) satellite communication network which is capable of establishing synchronization without transmission of distance information between control and local earth stations so as to increase throughput of the network.

It is another object of this invention to provide an earth station which is used in a TDMA satellite communication network of the type described and which makes control of transmission timing unnecessary.

It is a further object of this invention to provide an earth station of the type described which is operable as a control earth station and which favorably controls synchronization of the TDMA satellite communication network.

It is a still further object of this invention to provide an earth station of the type described, which is operable as a local earth station and which is simple in structure and inexpensive.

A control earth station to which this invention is applicable is for use in a time division multiple access network to communicate with a local earth station through a geostationary satellite which fluctuates from a standard position into a deviated position with time with a spatial deviation left between the standard and the deviated positions. The control earth station comprises transmission timing means for transmitting a transmission reference timing signal towards the geostationary satellite, first detecting means for receiving a reception timing signal which results from the transmission reference timing signal sent back from the satellite, and reception timing control means coupled to the transmission timing means and the first detecting means for controlling a reception time instant determined for the local earth station. According to this invention, the reception timing control means comprises measuring means responsive to the reception timing signal for measuring a time difference between the transmission reference timing signal and the reception signal to determine an actual distance between the control earth station and the satellite, standard delay providing means for providing a standard delay time determined by a standard distance between the control earth station and the standard position of the satellite, second detecting means coupled to the measuring means and the standard delay providing means for detecting a time deviation resulting from the spatial deviation of the satellite, with reference to the time difference and the standard delay time, and varying means coupled to the second detecting means and the standard delay providing means for varying the reception time instant for the local earth station with reference to the standard delay time and the time deviation.

DESCRIPTION OF THE PREFERRED EMBODIMENT

Prior Art

Figure 1:
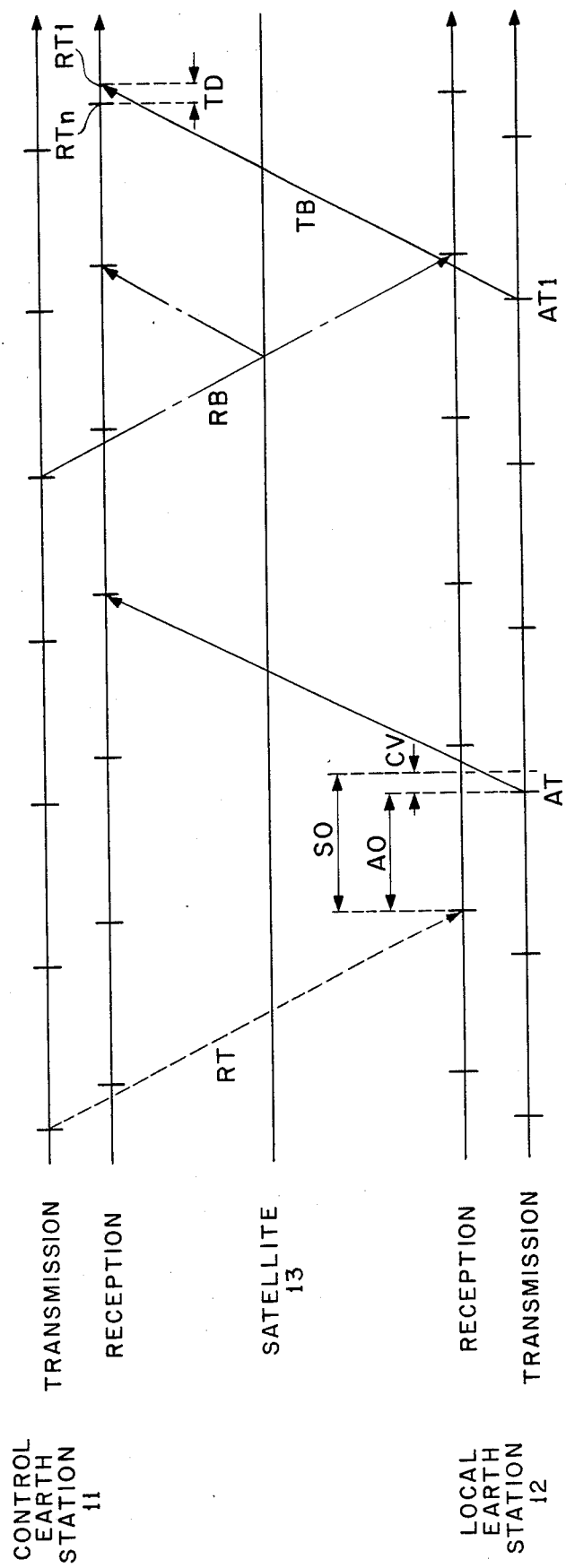
FIG. 1 is a time chart for use in describing operation of a conventional TDMA satellite communication network.

Referring to FIG. 1, a conventional synchronization control method will be described for a better understanding of this invention. Such a control method is applicable to a time division multiple access (TDMA) satellite communication network comprising a plurality of earth stations one of which is operable as a control or reference earth station 11 and the remaining ones of which are operable as local or peripheral earth stations exemplified by a single local earth station 12. Each of the control and the local earth stations 11 and 12 is communicable with one another through a satellite 13.

The control earth station 11 can transmit a reference burst to the satellite 13 in the form of an up-link signal to deliver the reference burst to the respective earth stations in the form of a down-link signal.

The satellite 13 might undesirably move from a standard position to a deviated position with a spatial deviation or distance variation left between the standard and the deviated positions, although the satellite is placed on a geostationary orbit. Therefore, the control earth station 11 measures a distance between the satellite 13 and one or a plurality of the earth stations in the illustrated satellite communication network. The measured distance may be either a distance between the earth station or stations and the standard position of the satellite 13 or a distance between the earth station or stations and the deviated position of the satellite 13. Anyway, the measured distance indicates an actual distance between the earth station or stations and the satellite 13. Sine the measured distance may be indicative of a position of the satellite 13, the measured distance may be produced as a position information signal. The measured distance is produced from the control earth station 11 as a distance information signal representative of the measured distance, control station 11 can measure the spatial deviation between the standard and the deviated positions to produce a position error signal indicative of the spatial deviation.

On the other hand, it is assumed that each of the local earth stations 12 can control and correct a transmission timing assigned thereto in response to the distance or position information signal and the position error signal. When the local earth station in question can not receive its own transmission burst through the satellite 13, the position error signal must be delivered to the local earth station in question. Otherwise, delivery of the position error signal is unnecessary. In the example being illustrated, the illustrated local earth station 12 can not receive its own transmission burst.

On initiallization of the network, the reference burst is sent as a reference timing signal RT from the control earth station 11 through the satellite 13 to the illustrated local earth station 12. In this event, the position information signal is also given from the control earth station 11 to the local earth station 12. Responsive to the reference timing signal RT, the local earth station 12 determines an actual transmission timing AT with reference to a reception timing of the reference timing signal RT. For this purpose, the local earth station 12 previously calculates a standard offset time value SO determined by the distance between the local earth station 12 and the standard position of the satellite 13. The local earth station 12 adjusts the standard offset time value SO in response to the position information signal. Specifically, a correction value CV is calculated from the position information signal in the local earth station 12 and is added to or subtracted from the standard offset time value SO. In consequence, an actual offset time value AO is obtained by the local earth station 12 to determine the actual transmission timing AT. The transmission burst is transmitted from the local earth station 12 at the actual transmission timing and is received by the control earth station 11 through the satellite 13. In the illustrated example, the correction value CV is subtracted from the standard offset time value SO. This shows that the satellite 13 becomes nearer to the local earth station 12 than the standard position.

Once synchronization is established among the earth stations, the control earth station 11 receives the transmission burst transmitted from each local station together with the reference burst (depictd at RB) returned back from the satellite 13. In FIG. 1, the transmission burst is assumed to be transmitted at another transmission timing depicted at AT1 with reference to the reference burst RB and is received through the satellite 13 at an actual reception time instant RT1. If the transmission burst is to be received by the control earth station 11 at a normal reception time instant RTn, a time deviation TD takes place between the normal and the actual reception time instants RTn and RT1 and might be equal to the correction value CV. The control earth station 11 monitors the time deviation TD between the normal and the actual reception time instants RTn and RT1 in response to the reference burst sent back from the satellite 13. The time deviation TD is delivered in the form of the position error signal from the control earth station 11 to the illustrated local earth stations 12 through the satellite 13. The local earth station 12 controls the transmission timing in response to the time deviation TD so that the transmission burst of the local earth station 12 is received at the normal reception time instant RTn.

In any event, the transmission timing should be varied by the use of a transmission timing control device in each local earth station. In addition, a superfluous information signal, such as the position information signal and the position error signal, must be transmitted among the earth stations. This results in a reduction of throughput in the TDMA satellite communication network.

Principle of the Invention

Figure 2:
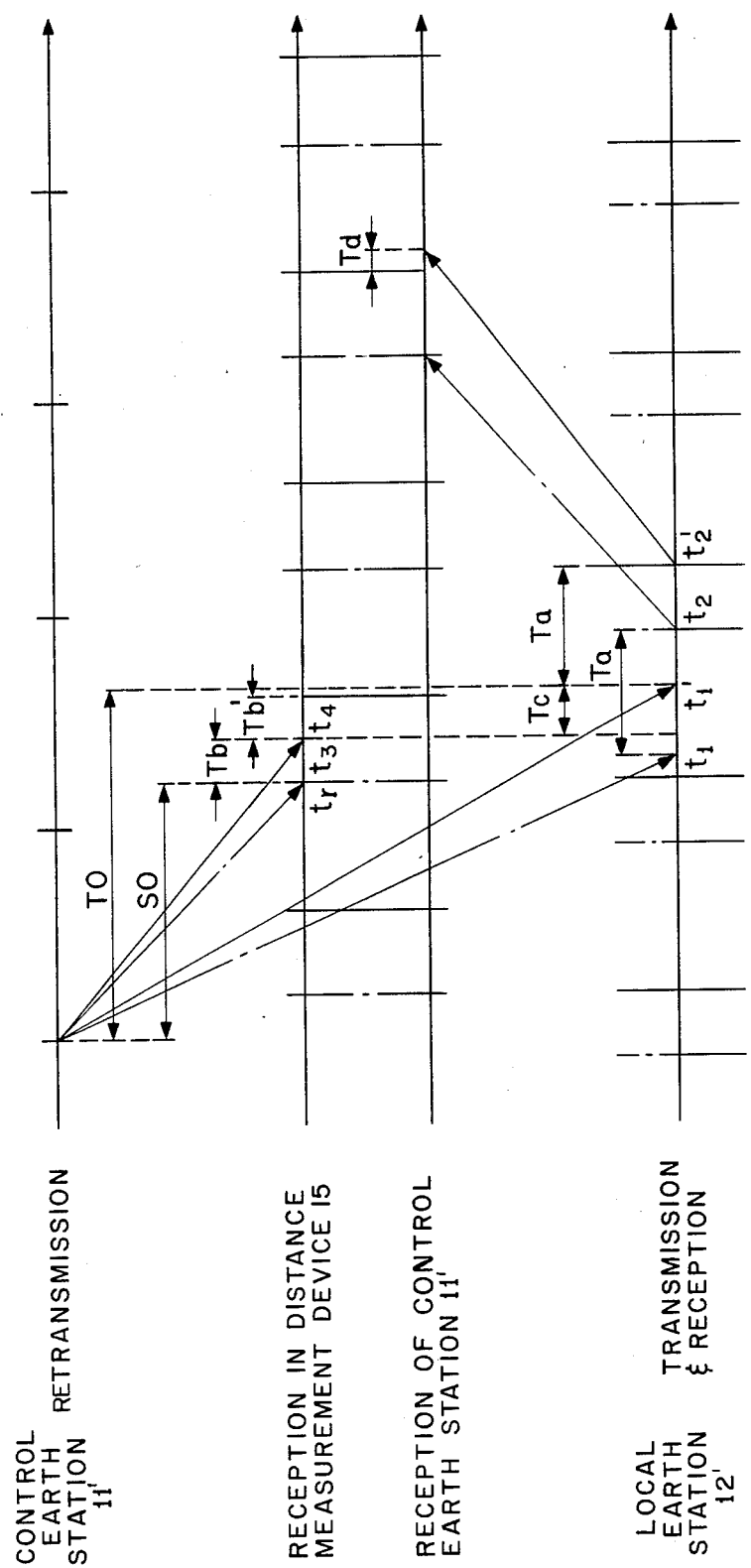
FIG. 2 is a time chart for use in describing a principle of this invention.

Referring to FIG 2, a principle of this invention will be described so as to facilitate an understanding of this invention. This invention is applicable to a TDMA satellite communication network comprising a plurality of earth stations which are divisible into a control earth station 11' and local earth stations 12' and which are communicable with one another through a satellite (not shown in this figure), like in FIG. 1. The satellite is placed on an orbit which is spaced apart from the earth's surface by an altitude of about 36,000 km. The earth stations are distributed on the earth's surface with a spatial interval or distance left between two adjacent ones of the earth stations. The spatial interval is several thousands of kilometers at most and is very shorter than the altitude of the satellite.

Distances between the earth stations and the satellite are different from one another and are variable with time, as mentioned in conjunction with FIG. 1.

This means that delay times between the earth stations and the satellite are also different from one another and variable with time. However, it is to be noted that differences and variations of the delay times can be very shorter than a width of a window opened for synchronization of the respective earth stations. Such differences and variations of the delay times may therefore be absorbed by substituting a time variation of the delay time measured at the control earth station 11' for the time variations of delay times measured at the respective earth stations and by selecting the width of the window. A time variation of the control earth station 11' may be called a selected time variation. Such substitution of the selected time variation of delay time in question scarcely influences synchronization when differences between the selected time variation and the other time variations are smaller than the widths of the windows.

In order to carry out the above-mentioned substitution of the time variation, the control earth station 11' comprises a distance measurement device 15 for measuring the actual distance between the control earth station 11' and the satellite by detecting a time difference between transmission of the reference burst and reception of the reference burst returned back to the control earth station 11 through the satellite.

In FIG. 2, a reference burst is transmitted from the control earth station 11' to the respective earth stations through the satellite as a transmission reference timing signal RE at a predetermined period of, for example, 210 milliseconds. The control earth station 11' has a standard offset time value SO previously calculated with reference to a standard distance between the control earth station 11' and the standard position of the satellite.

Let a delay time between the satellite and the control earth station 11' be equal to the standard offset time value SO. In this event, operation is carried out in a manner as shown at dot-and-dash lines in FIG. 2.

More specifically, each reference burst RE is received by the control earth station 11' through the satellite at a reference time instant $t_r$ after lapse of a standard offset time which is equal to the standard offset time value SO. Likewise, the refernece burst RE is also received by the local earth stations 12' after lapse of each local offset time which may slightly be different from the standard offset time and which is determined by the distance between each earth station and the satellite.

The illustrated local station 12' receives the reference burst RE at a local reception time instant $t_1$ as a reception timing signal and determines a local transmission time instant $t_2$ with reference to the local reception time instant $t_1$. In the example being illustrated, the local transmission time instant $t_2$ appears after lapse of a predetermined time interval Ta. The predetermined time interval Ta is defined at every local earth station 12' in consideration of the time variation or time difference of the delay times between the control earth station 11' and the local earth station 12'.

Transmission is carried out at the local transmission time instant $t_2$ in a direction from the local earth station 12' to the control earth station 1'. Reception is made at the control earth station 11' within a window opened for the reception.

Let variations of delay times take place between the control and the local earth stations 11' and 12' as a result of movement of the satellite from the standard position to the deviated one. In this situation, it is assumed that the reference burst RE is received as a reception timing signal at a control reception time instant $t_3$ after a delay time Tb which corresponds to twice the spatial variation left between the standard and the deviated positions of the satellite and which may be referred to as the twice variation of the delay time in the control earth station 11'. Anyway, the distance measurement device in the control earth station 11' determines the distance between the control earth station 11' and the deviated position of the satellite by measuring a time difference between the transmission reference timing signal (defined by the reference burst RE) and the control reception time instant $t_3$.

Suppose that a distance between the local earth station 12' and the deviated position of the satellite is longer than the distance between the control earth station 11' and the deviated position. Operation is carried out in a manner as depicted at solid lines. More particularly, arrival of the reference burst RE at the local earth station 12' is delayed relative to its arrival at the control earth station 11'. As a result, the reference burst RE is received as a reception timing signal at a delayed reception time instant $t_1'$ delayed relative to the control reception time instant $t_3$ by an actual time interval Tc. The actual time interval Tc corresponds to twice a difference of the distances between the control earth station 11' and the deviated position of the satellite and between the local earth station 12' and the deviated position.

A reception offset time TO for the local earth station 12' is specified by a total delay time equal to a sum of the standard offset time SO, the time variation Tb, and the actual time interval Tc. It is to be noted that the standard offset time SO and the time variation Tb are actually measured at the control earth station 11'while the actual time interval Tc is determined for the local earth station 12' without any measurement.

The local earth station 12' provides a delayed transmission time instant $t_2'$ when the predetermined time interval Ta lapses after the delayed reception time instant $t_1'$. At the delayed transmission time instant $t_2'$, transmission is made from the local earth station 12 to the control earth station 11'.

In order to respond to the transmission carried out at the delayed transmission time instant $t_2'$, the window must be opened in the control earth station 11' at a reception timing. For this purpose, the reception timing of the control earth station 11' is varied by substituting an additional time variation Tb' in the control earth station 11' for the actual time interval Tc in the local earth station 12'. In other words, the actual time interval Tc in the local earth station 12' is simulated by the additional time variation Tb' in the control earth station 11' to determine the reception timing. In the illustrated example, the additional time variation Tb' is selected so that it becomes equal to the time variation Tb, although the additional time variation Tb' is somewhat different from the actual time interval Tc of the local earth station 12'.

Consequently, the window for the local earth station 12' is opened for a preselected duration of, for example, 80 microseconds after an additional reception time instant $t_4$ which is delayed by the additional time deviation Tb' relative to the control reception time instant $t_3$ and which defines the reception timing. Thus, the location of the window is predicted in the control earth station 11' by adding twice the delay time Tb to the standard offset time (SO).

Reception might be made at the control earth station 11' with a time error Td left between the reception timing and an actual reception timing, as illustrated along the third line. However, it is possible to shorten the time error Td in comparison with the width of each window because the space intervals among the earth stations are considerably shorter than the distance between the satellite and each earth station. Accordingly, synchronization is readily established by using the additional time deviation Tb' in the control earth station 11' instead of the actual delay time Tc in the local earth station 12'.

Preferred Embodiment

Figure 3:
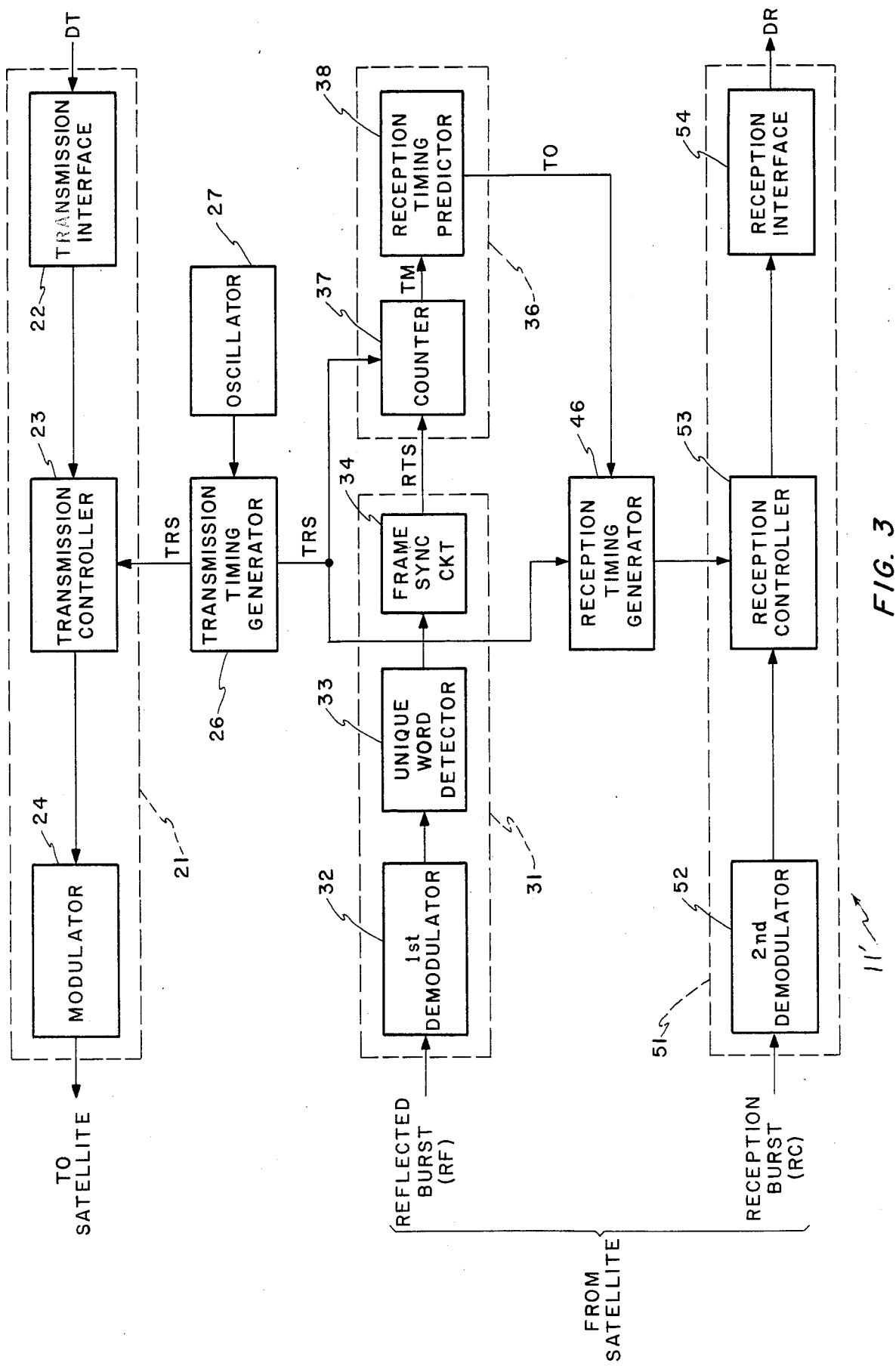
FIG. 3 is a block diagram of a control earth station according to a preferred embodiment of this invention.

Referring to FIG. 3, the control earth station 11' which can carry out the operation described in conjunction with FIG. 2 comprises a transmitter section 21 supplied with a sequence of transmission data signals DT from a substation or substations (not shown) connected to the control earth station 11'. The transmitter section 21 comprises a transmission interface 22, a transmission controller 23, and a modulator 24, all of which are similar to those known in the art and which will not be described any longer. At any rate, the transmission data signal sequence DT is sent through the transmission interface 22, the transmission controller 23, and the modulator to the satellite in the form of a data burst.

The transmission controller 23 is coupled to a transmission timing generator 26 given an oscillation signal of a predetermined frequency from an oscillator 27. The transmission timing controller 26 produces a transmission reference timing signal TRS in cooperation with the oscillator 27. The transmission reference timing signal TRS is delivered at a predetermined period of, for example, 210 milliseconds to the transmission controller 23 to be sent to the satellite as a sequence of reference bursts RE shown in FIG. 2.

The reference burst RE is delivered to the local earth stations (not shown in FIG. 3) through the satellite and sent back from the satellite to the control earth station 11' as a reflected burst RF. The reflected burst RF carries the transmission reference timing signal TRS. Although the reflected burst RF may include any other data signals destined to the control earth station 11', such data signals might be left out of consideration.

The reflected burst RF is supplied to a detecting circuit 31 comprising a first demodulator 32, a unique word detector 33, and a frame synchronization circuit 34, all of which are known in the art. The detecting circuit 31 is operable to monitor the reflected burst RF and to establish sychronization. To this end, a unique word is detected by the unique word detector 33 and is sent to the frame synchronization circuit 34. The frame synchronization circuit 34 produces a reception timing signal RTS which results from the transmission reference timing signal TRS.

The reception timing signal RTS is sent to a distance measuring circuit 36 for measuring a distance between the control earth station 11' and the satellite of which the position might be variable. The distance measuring circuit 36 comprises a counter 37 operable in response to the transmission reference timing signal TRS and the reception timing signal RTS and a reception timing predictor 38 operable in a manner to be described later. The counter 37 starts counting a clock pulse sequence in response to the transmission reference timing signal TRS and stops counting in response to the reception timing signal RTS. The counter 36 therefore has a count indicative of a time difference between the transmission reference timing signal TRS and the reception timing signal RTS and specifies twice the distance between the control earth station 11' and the satellite. The time difference is equal to the standard offset time (SO) or a sum of the standard offset time (SO) and the time deviation Tb, both of which are described in conjunction with FIG. 2. When the satellite is moved from the standard position to the deviated position, the counter 36 serves to measure twice the actual distance between the control earth station 11' and the satellite and therefore determines the distance between the control earth station 11' and the satellite.

Figure 4:
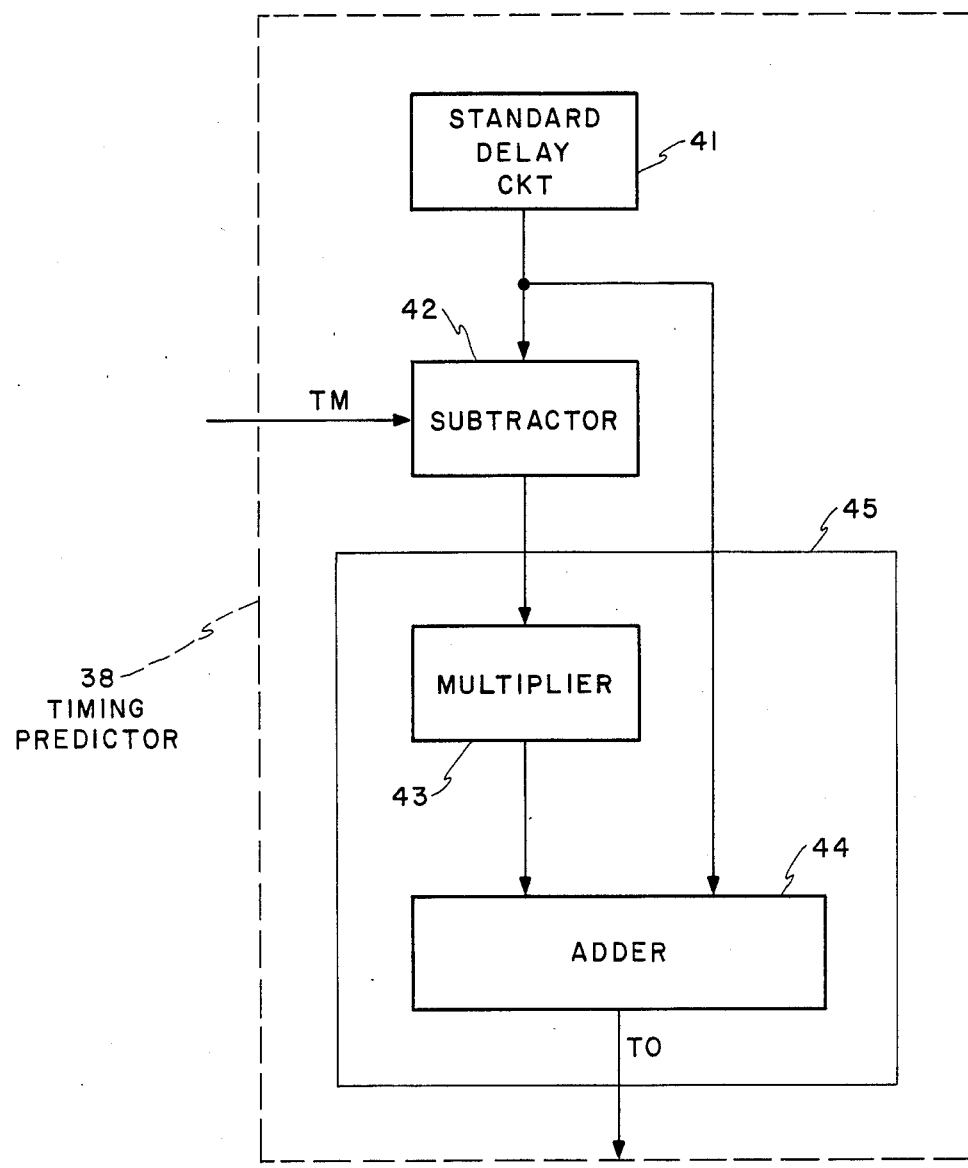
FIG. 4 is a block diagram for use in describing a part of the control earth station illustrated in FIG. 3 in detail.

Referring to FIG. 4 together with FIG. 3, the reception timing predictor 38 is supplied with the count of the counter 37 as a time difference signal TM representative of the above-mentioned twice difference. In the reception timing predictor 38, a standard delay circuit 41 produces a standard offset signal indicative of the standard offset time value SO (FIG. 2). The standard offset time (SO) indicates a standard distance between the control earth station 11' and the standard position of the satellite, as mentioned before.

A subtractor 42 subtracts the time difference (TM) from the standard offset time (SO) to detect the time delay or time deviation Tb resulting from a movement of the satellite from the standard position to the deviated position. The time deviation Tb is delivered to a multiplier 43 as a time deviation signal.

The multiplier 43 multiplies the time deviation Tb by a factor of two to calculate twice the time deviation Tb as a prediction time deviation. The prediction time deviation is added by an adder 44 to the standard offset time (SO) to specify the additionial reception time instant or reception time instant $t_4$, described in connection with FIG. 2. Thus, a combination of the multiplier 43 and the adder 44 is operable to calculate and vary the reception time instant $t_4$ and may be named a varying circuit 45 for varying the reception time instant.

The reception offset time TO between the transmission of the reference burst RE and the reception time instant $t_4$ is equal to a sum of the standard offset time (SO) and a couple of the time deviations Tb, as mentioned before. The reception time instant therefore indicated by a reception offset time signal TO representative of the reception offset time.

In FIG. 3, a reception timing generator 46 is supplied with the transmission reference timing signal TRS and the reception offset time signal TO. A reception timing signal is produced from the reception timing generator 46 when the reception offset time signal TO is received after reception of the transmission reference timing signal TRS.

A receiver section 51 comprises a second demodulator 52, a reception controller 53, and a reception interface 54, which are all known in the art. The reception burst RC is sent from the local earth station 12' through the second demodulator 52 to the reception controller 53 supplied with the reception timing signal. When the window is opened in response to the reception timing signal, reception synchronization is established in the control earth station 11'.

Figure 5:
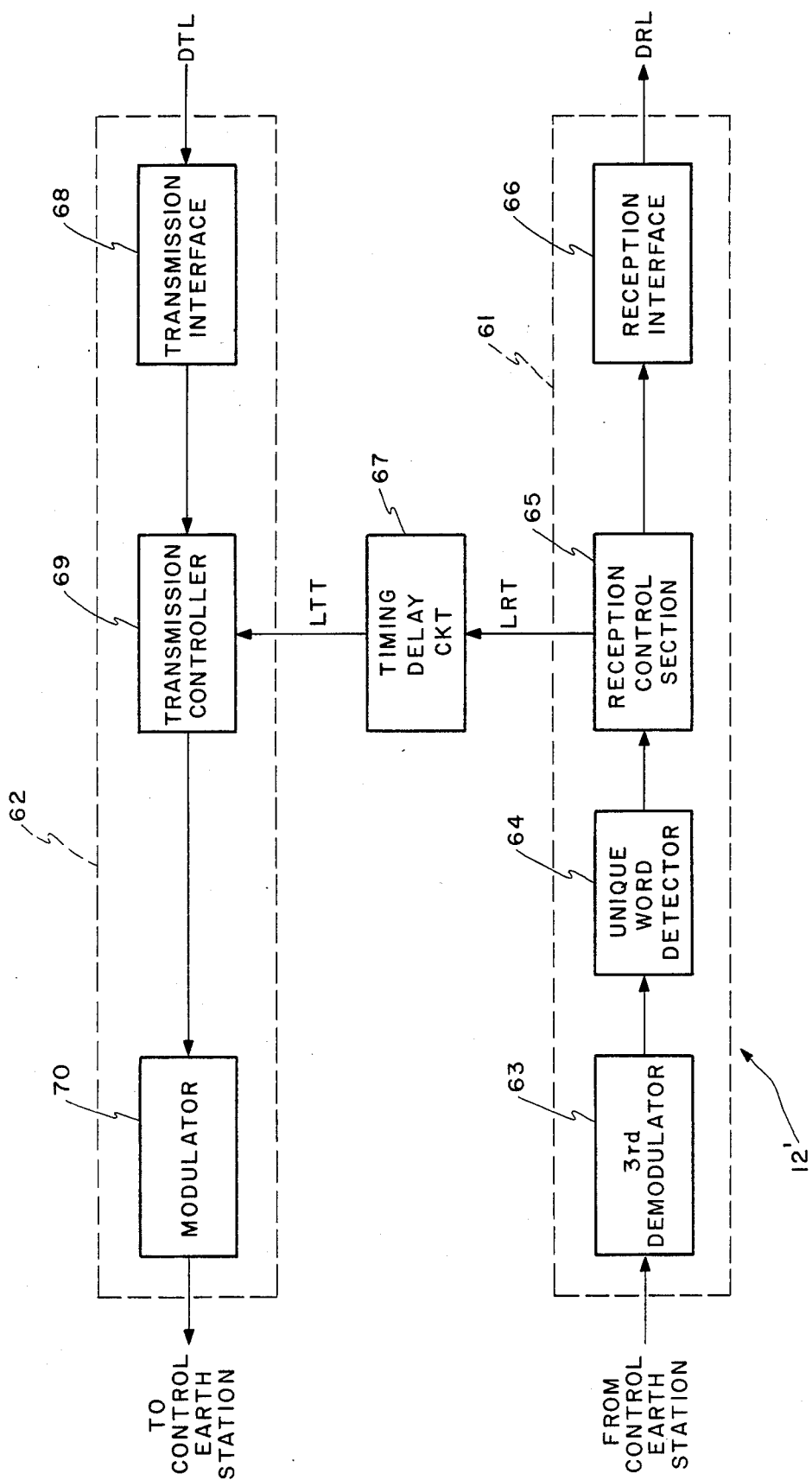
FIG. 5 is a block diagram of a local earth station communicable with the control earth station illustrated in FIGS. 3 and 4.

Referring to FIG. 5, the local earth station 12' is communicable with the control earth station 11' illustrated in FIGS. 2 through 4 and comprises a reception portion 61 and a transmission portion 62 which are coupled through the satellite (not shown) to the control earth station 11'.

A reception burst is sent from the control earth station 11' to the receiver portion 61 of the local earth station 12' and is sent through a third demodulator 63 and a unique word detector 64 to a reception control section 65. The unique word detector 64 detects a unique word assigned to the control earth station 11' and produces a local reception timing signal LRT on detection of the unique word. After establishment of synchronization, a reception data signal DRL is sent through a reception interface 66 to a terminal end (not shown).

The local reception timing signal LRT is given to a timing delay circuit 67. The timing delay circuit 67 delays the local reception timing signal LRT by the predetermined time interval Ta illustrated in FIG. 2 and supplies the transmission portion 62 with a delayed local reception timing signal as a local transmission timing signal LTT.

The transmission portion 62 comprises a transmission interface 68, a transmission controller 69, and a modulator 70. The transmission controller 69 is controlled by the local transmission timing signal LTT to be put into a synchronized state. Thereafter, a local transmission data signal DTL is sent through the transmission interface 68, the transmission controller 69, and the modulator 70 to the satellite.

In FIG. 5, description has been made on the assumption that the illustrated local earth station 12' can not receive a transmission burst sent from the local earth station 12' itself. However, this invention is also applicable in the case where the local earth station 12' can receive its own transmission burst.

Thus, the control earth station 11' controls reception synchronization in consideration of the time deviation related to the local earth stations 12'. This dispenses with control operation of transmission timings in the local earth stations 12' and with delivery or broadcast of distance information of the satellite to the local earth stations 12'. The local earth stations 12' become simple in structure due to a light load of processing.

While this invention has thus far been described in conjunction with a preferred embodiment thereof, it will readily be possible for those skilled in the art to put this invention into practice in various other manners. For example, the additional time deviation Tb' may not be equal to the time deviation Tb. In addition, a plurality of the local earth stations may be included in the satellite communication network.

What is claimed is:

1. In a control earth station for use in a time division multiple access network to communicate with a local earth station through a geostationary satellite which fluctuates from a standard position into a deviated position with time with a spatial deviation left between said standard and said deviated positions, said control earth station comprising transmission timing means for transmitting a transmission reference timing signal towards said geostationary satellite, first detecting means for receiving a reception timing signal which results from the transmission reference timing signal sent back from said satellite, and reception timing control means coupled to said transmission timing means and said first detecting means for controlling a reception time instant determined for said local earth station, the improvement wherein said reception timing control means comprises:

measuring means responsive to said reception timing signal for measuring a time difference between said transmission reference timing signal and said reception time instant to determine an actual distance between said control earth station and said satellite;

standard delay providing means for providing a standard delay time determined by a standard distance between said control earth station and said standard position of the satellite;

second detecting means coupled to said measuring means and said standard delay providing means for detecting a time deviation resulting from said spatial deviation of the satellite, with reference to said time difference and said standard delay time; and varying means coupled to said second detecting means and said standard delay providing means for varying said reception time instant for the local earth station with reference to said standard delay time and said time deviation.

2. A control earth station as claimed in claim 1, wherein said varying means comprises:

calculating means coupled to said second detecting means for calculating twice the time deviation as a result of calculation;

adding means coupled to said calculating means and said standard delay providing means for adding said result of the calculation to said standard delay time to provide a total delay time equal to a sum of said result of the calculation and said standard delay time; and means coupled to said transmission timing means and said adding means for delaying said transmission reference timing signal by said total delay time to provide said reception time instant.

3. A control station as claimed in claim 1, wherein said transmission reference timing signal is produced at an invariable period.

4. In a local earth station for use in a time division multiple access network to communicate with a control earth station through a geostationary satellite, said local earth station being supplied with a reception timing signal from said control earth station through said geostationary satellite, and carrying out transmission in synchronism with a local transmission timing signal, the improvement wherein said local earth station comprises:

delay means responsive to said reception timing signal for delaying said reception timing signal by a predetermined duration to produce a delayed timing signal, said predetermined duration being determined in said local earth station; and means for providing said delayed timing signal as said local transmission timing signal.

5. A satellite communication network for use in carrying out communication between a control earth station and a local earth station via a geostationary satellite which fluctuates from a standard position into a deviated position with time with a spatial deviation left between said standard and said deviated positions;

said control earth station comprising:

transmission timing means for transmitting a transmission reference timing signal toward said geostationary satellite;

first detecting means for receiving a reception timing signal which results from the transmission reference timing signal sent back from said satellite;

measuring means responsive to said reception timing signal for measuring a time difference between said transmission reference timing signal and said reception time instant to determine an actual distance between said control earth station and said satellite;

standard delay providing means for providing a standard delay time determined by a standard distance between said control earth station and said standard position of the satellite;

second detecting means coupled to said measuring means and a said standard delay providing means for detecting a time deviation resulting from said spatial deviation of the satellite, with reference to said time difference and said standard delay time;

varying means coupled to said second detecting means and said standard delay providing means for varying said reception time instant for the local earth station with reference to said standard delay time and said time deviation;

said local earth station being supplied with the transmission reference timing signal a local reception timing signal and comprising:

delay means responsive to said local reception timing signal for delaying said local reception timing signal by a predetermined duration to produce a delayed timing signal, said predetermined duration being determined in said local earth station; and means coupled to said delay means for carrying out transmission in accordance with said delayed timing signal.

6. A satellite communication network as claimed in claim 5, wherein said varying means of the control earth station comprises:

calculating means coupled to said second detecting means for calculating twice the time deviation as a result of calculation;

adding means coupled to said calculating means and said starter delay providing means for adding said result of the calculation to said standard delay time to provide a total delay time equal to a sum of said result of the calculation and said standard delay time; and means coupled to said transmission timing means and said adding means for delaying said transmission reference timing signal by said total delay time to provide said reception time instant.

* * * * *